United States Patent [19]

VanDeberg

[11] 3,905,466
[45] Sept. 16, 1975

[54] MACHINE LOADER TRANSFER MECHANISM INCLUDING A TRANSFER LEVER WITH AN OPERABLY ASSOCIATED STOP ARM

[75] Inventor: Walter H. VanDeberg, Berkley, Mich.

[73] Assignee: F. Joseph Lamb Company, Detroit, Mich.

[22] Filed: July 15, 1974

[21] Appl. No.: 488,277

[52] U.S. Cl. .................................. 198/25; 198/32
[51] Int. Cl. ................................................ B41j 9/04
[58] Field of Search .. 198/25, 31 R, 31 AA, 31 AB, 198/31 AC, 32, 166, 34, 20, 26; 193/40

[56] References Cited
UNITED STATES PATENTS

| | | | |
|---|---|---|---|
| 2,202,640 | 5/1940 | Thomas | 198/26 X |
| 2,219,827 | 10/1940 | Kimball et al. | 198/32 |
| 2,511,099 | 6/1950 | Case | 193/40 |

Primary Examiner—Richard A. Schacher
Assistant Examiner—James M. Slattery
Attorney, Agent, or Firm—Barnes, Kisselle, Raisch & Choate

[57] ABSTRACT

A mechanism for transferring workpieces from one or two conveyors to a single machine loader by utilizing one or two workpiece transfer levers which are oscillated in an arcuate path. With each transfer lever there is operably associated a stop arm arranged to retain the line of workpieces on the conveyor when the leading workpiece is being transferred to the loading location. Novel guide members are provided for guiding workpieces alternately from the ends of the two conveyors to the loading station.

20 Claims, 15 Drawing Figures

MACHINE LOADER TRANSFER MECHANISM INCLUDING A TRANSFER LEVER WITH AN OPERABLY ASSOCIATED STOP ARM

This invention relates to an article handling apparatus and, more particularly, to a mechanism useful, for example, for loading workpieces into a machine which handles or performs manufacturing operations on the workpiece. In manufacturing systems, workpieces are usually carried from machine to machine for performing successive operations by conveyors, either powered or gravity. If gravity conveyors are utilized, it is necessary to elevate the workpieces to an elevation somewhat higher than the destination of that particular section of the system so that enough angular pitch will exist to allow the workpieces to overcome friction and freely start to travel on the rollers after their progress has been interrupted. For economy and other reasons, such as the saving of floor space, it is sometimes advantageous to use a single elevating machine to effect this change of altitude of several lines of parts from different sources. This requires the blending of the workpieces into a single line from multiple supply lines. Sometimes the machines performing the work operations also require the alternate selection of parts from more than one source. One of the inherent requirements of a loading mechanism is to restrain the remaining portion of a line of workpieces, while it takes the leading workpiece and places it in a position to be acted upon by the machine being supplied.

Mechanisms of the type described are usually relatively complex and, as a result, they are expensive, unreliable and difficult to maintain. If they receive their workpieces from a multiple source, a separate operation is normally required to blend then into a single line to supply the machine loader.

It is an object of this invention to provide a simple, inexpensive and reliable workpiece loader for machines which is of substantially minimum size relative to the workpieces being handled.

It is another object of this invention to provide a loader which enables blending of workpieces from several sources to a single discharge location.

It is a further object of this invention to provide a simple and sturdy escapement and holding means to restrain the line of workpieces upstream from the loader.

These and other objects and advantages of this invention will be readily understood by those acquainted with the design and use of machine loaders from the following specifications and accompanying drawings.

Figures 1, 5:
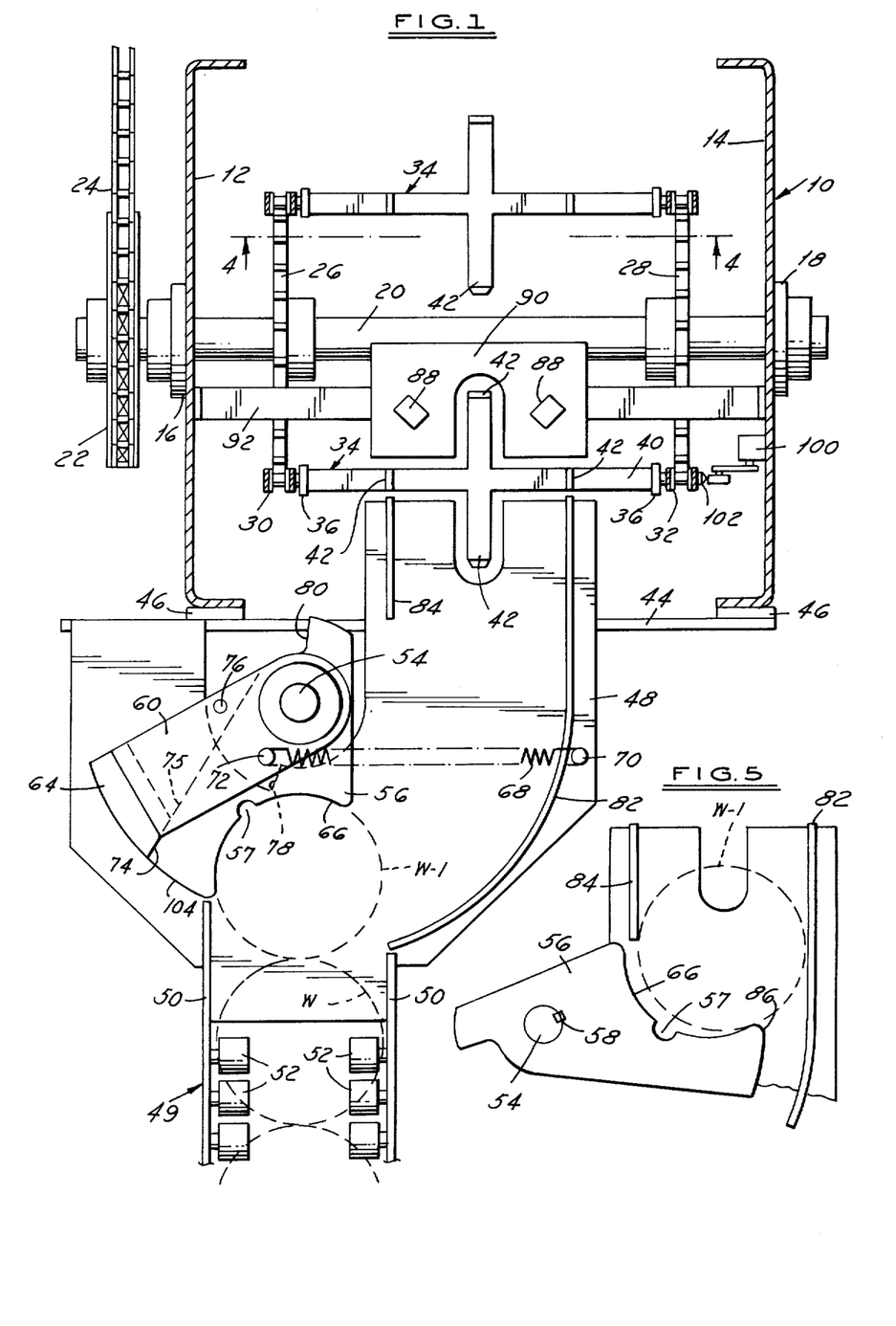
FIG. 1 is a section through a workpiece elevator and plan view of one version of a workpiece loader.
FIG. 5 is a fragmented view of FIG. 1.

FIG. 1 shown an assembly 10 of a commonly used roller chain and bucket type parts elevator constructed of vertical side channels 12 and 14 on which are mounted supporting bearing pillow blocks 16 and 18 journalling drive shaft 20. A sprocket 22, through drive chain 24 from a power source (not shown), rotationally drives shaft 20. This power source may be indexing or continuously rotating. Keyed to shaft 20 are sprockets 26 and 28 driving elevator chains 30 and 32, which have carrier assemblies 34 suspended between them at vertically spaced intervals.

Figures 2, 4:
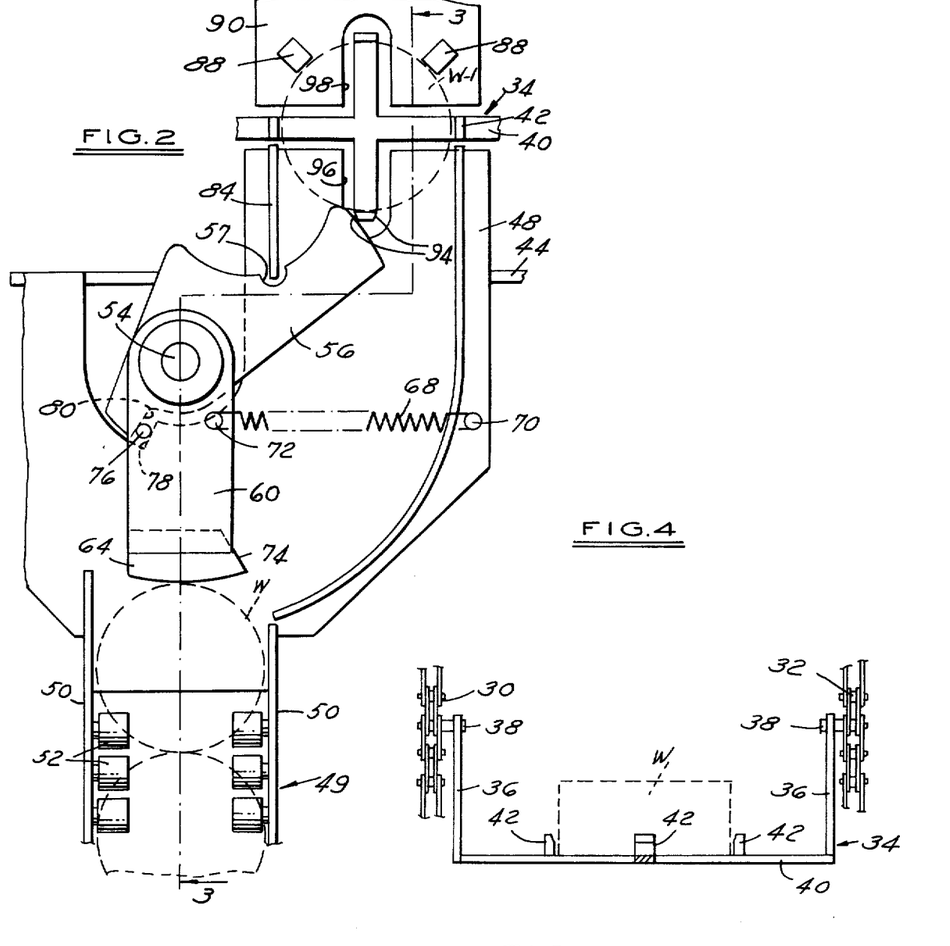
FIG. 2 is a partial view of FIG. 1 showing the workpiece in a loaded position.
FIG. 4 is a view along line 4—4 of FIG. 1.

As shown in FIGS. 1 and 4, the upwardly extending arms 36 of each carrier assembly 34 are pivotally mounted on chains 30 and 32 by pins 38 and are attached to a cross-shaped support 40. Retaining guides 42 are arranged on support 40 to locate and retain a workpiece W. The center of gravity of the carrier assembly is substantially below the pivot pins 38 so that the carrier assembly will retain the suspended orientation shown in FIG. 4 under all conditions including traveling around the upper and lower sprockets 26 and 28. The upper sprockets are not shown.

Figure 3:
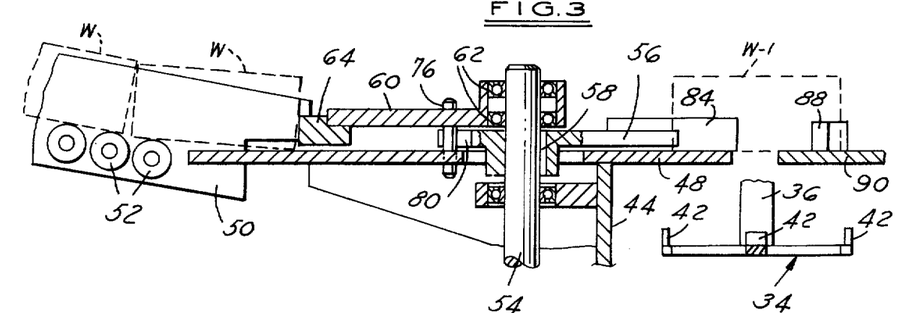
FIG. 3 is a section of FIG. 2 along a line 3—3.

Referring to FIGS. 1, 2 and 3, the loader apparatus consists of mounting bracket 44 attached to elevator assembly 10 through spacers 46 which are used to precisely horizontally locate the loader relative to carrier assemblies 34. Bracket 44 supports top horizontal workpiece support plate 48 which has attached thereto a supply conveyor 49 consisting of side rails 50 and work support rollers 52 which are inclined for the delivery of workpieces W by gravity to plate 48. Loader lever 56 is attached to an oscillating shaft 54 by key 58 (FIG. 3) and is spaced slightly above plate 48. Stop arm 60 is mounted on shaft 54 above lever 56 through bearings 62 and has secured to its free end hardened stop block 64. When the workpieces W are delivered to the loader from conveyor 49, the first in line workpiece W-1 engages the arcuately-shaped pocket 66 of lever 56 and thus stops any further forward movement of all workpieces in the line. With the loader in the position shown in FIG. 1 when shaft 54 is rotated in a counterclockwise direction, lever 56 moves workpieces W-1 to the right in an arcuate path, separating it from the line of remaining workpieces W in the conveyor and thus allowing them to advance.

In FIG. 1, stop arm 60 is being retained in position as illustrated by the tension of a spring 68 which at one end is anchored to top plate 48 by post 70. The other end of this spring is attached to arm 60 by pin 72, the force of the spring urging face 74 of stop block 64 against the rear edge 75 of lever 56. When lever 56 swings counterclockwise, arm 60 will follow until a stop pin 76 fixed on arm 60 abuts a stop shoulder 78 in plate 48, thus arresting arm 60 in a position to retain the remaining parts in the supply conveyor as shown in FIG. 2.

When workpiece W-1 is engaged by lever 56 and then arcuately displaced, the remaining workpieces in the conveyor advance a short distance before they contact the central portion of stop block 64, thus allowing arm 60 to reach the position shown in FIG. 2 before the remaining workpieces make contact with stop block 64. If for some reason arm 60 does not swing completely to the workpiece blocking position shown in FIG. 2 under the influence of spring 68, a notched abutment face 80 on lever 56 will engage stop pin 76 on arm 60 and forcibly rotate arm 60 to this position when lever 56 swings to the position illustrated in FIG. 2.

Where a series of workpieces enter an inclined gravity roller conveyor the first workpiece in line encounters rollers that are not revolving. The energy required to accelerate these rollers in succession will slow up the first piece until it is overtaken by the second. These two which are touching now furnish the accelerating energy and in turn are slower than the third which will join the first two. Soon there is a long train of pieces, all touching and in concert will deliver their combined energy to any object that brings them to an abrupt stop. This may be the workpieces that are at rest at the lower end of the conveyor or may be the lever 56 or stop 64 in the loader. If the shock is taken by those at the lower end of the conveyor, most of the energy is still transmitted to the conveyor members. It is, therefore, important for the stop block 64 to be in an engaged position to withstand these shock forces of continuous lines of pieces entering the supply conveyor at considerable velocities. In this connection it will be noted that shaft 54 on which arm 60 is journalled is aligned with the axis of conveyor 49.

As workpiece W-1 is further advanced in an arcuate path by loader lever 56, it is retained if needed by guide fence 82 on plate 48 and ultimately will be wiped out of pocket 66 of the loader lever 56 by guide 84 on plate 48 as shown in FIG. 5. The workpiece is then powered forward by the crest 86 of lever 56 and retained by guide fence 82 and guide 84 until it reaches locator stops 88 as shown in FIGS. 2 and 3. In order for guide 84 to easily remove the workpiece from pocket 66 in lever 56 it may have a location requirement that would create an interference between its end and lever 56. Therefore, a notch 57 in lever 56 may be provided to accommodate this end of guide 84, as shown in FIG. 2. Locator stops 88 are mounted on a nest plate 90 which is substantially on a common plane with top plate 48 and supported by a bracket 92 between side channels 12 and 14 of elevator assembly 10.

When the workpiece W-1 is in position on nest plate 90 the timing of the elevator is so arranged that the carrier assembly 34 (FIG. 3) will advance from below and lift it from its nested position. If the timing is such that this removal takes place before lever 56 returns, one of the cross arms of carrier assembly 34 has chamfers 94 (FIG.. 2) to adequately clear lever 56. Top plate 48 and nest plate 90 are provided with slots 96 and 98 to allow the passage of the cross arms of carrier assembly 34. The cycle of the loader is such that it is slightly faster than the sequence of the arrival of the carrier assemblies 34 at the loading nest. This cycle is initiated by a switch 100 mounted on side channel 14 as shown in FIG. 1. Switch 100 is actuated by switch dogs 102 mounted on chain 32, one for each carrier assembly. The switch is so located as to bring about the loading of a part on nest plate 90 just prior to the arrival of a carrier assembly.

It will be apparent that if the stop arm 60 were omitted and lever 56 were enlarged to extend its stop radius 104 far enough to retain the remaining workpiece in the conveyor during its full loading stroke, it would have such a large circumferential extent (at least 135°-140°) that there would not be room to accommodate it in its returned or retracted position. It is also apparent that the long contacting radius thus created would cause an excessive amount of wear on the workpieces it would be retaining.

Figures 6, 7, 8:
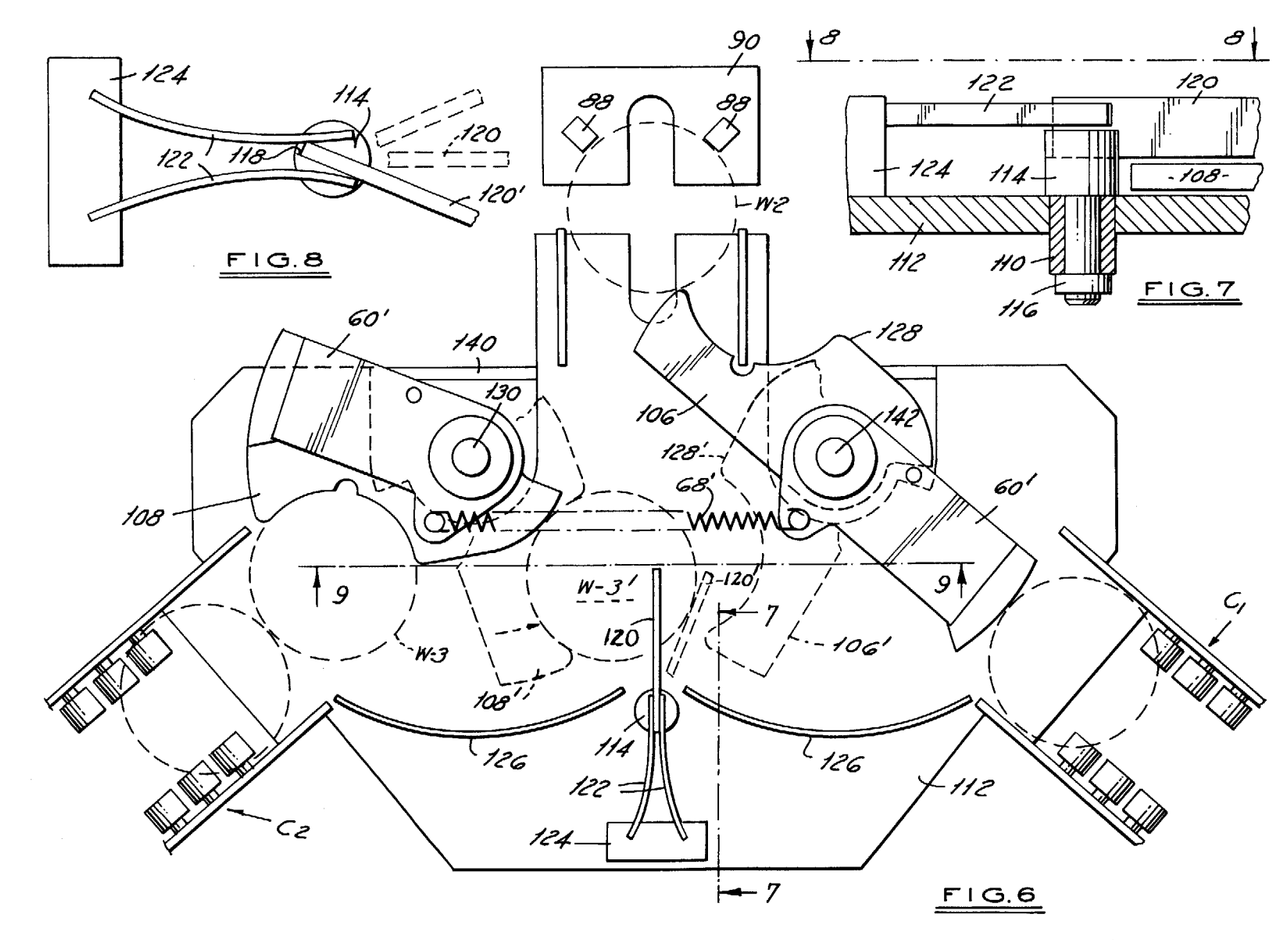
FIG. 6 is a plan view of a two source blending loader.
FIG. 7 is a view of 7—7 of FIG. 6.
FIG. 8 is a veiw of 8—8 of FIG. 7.

FIG. 6 shows another version of the invention where the loader receives workpieces from two conveying sources and alternately blends them into the single vertical lane of the elevator. This concept is substantially the same as the first described single conveyor loader. However, there are several important differences required in the structure in order to accomplish the blending of the workpieces.

By mechanism hereinafter described levers 106 and 108 are connected together such that they oscillate at the same rate and in the same angular direction simultaneously. Thus, when one lever is returning from the nest 90 of the elevator, the other will be advancing toward the elevator nest. The conveyors are arranged to deliver the workpieces along paths angularly displaced on opposite sides of the central axis of the loader. This is required in order to establish clearances between the workpiece being loaded and the lever that is returning. This will clearly be seen by following this described sequence.

In FIG. 6 lever 106 has displaced workpiece W-2 from conveyor C1 into nest 90 of the elevator and lever 108 is in its retracted position engaging and retaining workpiece W-3 at the end of conveyor C2. When the motion of the levers 106 and 108 is initiated both will rotate counterclockwise until their relative positions are reversed. for the purpose of clearly illustrating several of the problems that the invention solves, the levers are shown in phantom at 106' and 108' approximately in the center of their angular travel. It will be noted that workpiece W-3' and lever 108' have narrowly averted an interference with lever 106' just prior to the positions shown. It is the consideration of this required clearance that establishes the angular displacement of the two levers and thus establishes the location of the supply conveyors C1 and C2.

Referring to FIGS. 6 and 7, a bearing bushing 110 is mounted through top support plate 112 of the loader and journals a shaft 114 retained by collar 116. Shaft 114 is slotted at its upper end as at 118 to securely retain a locator blade 120. Bearing on opposite faces of locator blade 120, directly above shaft 114, are two deflected leaf springs 122 anchored in block 124 in such a way that the springs cooperate to hold blade 120 centered, as shown in solid lines in FIG. 6. When blade 120 is angularly displaced as in FIG. 8 springs 122 are further deflected and their contact with blade 120 moves off center, thus urging it back to the centered position. This action will occur in the same manner if the blade is displaced in the opposite angular direction, as shown at 120' in FIG. 6. Thus, a simple and effective blade centering device is provided.

The two guide fences 126 are arranged in a manner to retain the workpieces in the pockets of their respective levers 106,108. The simultaneous travel of the two levers 106,108 does not permit fences 126 to be constructed to engage and guide the workpieces for their full travel from their respective conveyors to nest 90 as does the guide fence 82 in the embodiment illustrated in FIGS. 1 through 5. Upon examination of FIG. 6 it will be noted that without some form of retention the workpiece W-3' would be displaced away from lever 108' into the vicinity of pocket in arm 106'. Blade 120 in its position 120' prevents this and retains the workpiece in the pocket of lever 108 until it reaches a position where edge 128 of lever 106 will take over and continue the guiding until it reaches a position equivalent to that shown in FIG. 5. After the workpiece has progressed far enough, blade 120 will again assume a centered position and then deflect in the other direction when a workpiece carried by arm 106 requires retention. Apart from the foregoing differences, the remainder of the two source blending loader of FIGS. 6 through 8 functions substantially the same as the single source loader illustrated in FIGS. 1 through 5, particularly with respect to the two stop arms 60' which are interconnected by tension spring 68'.

Figure 9:
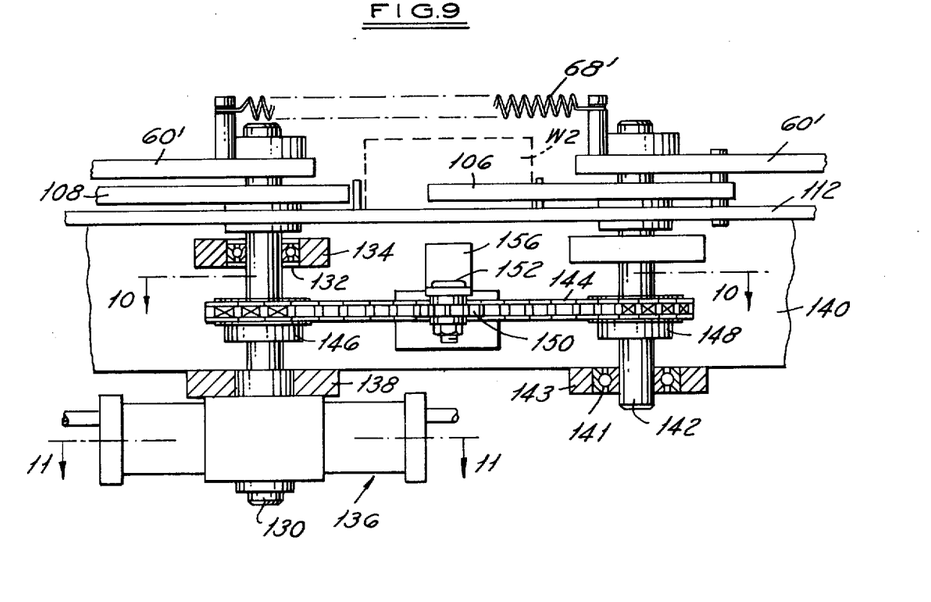
FIG. 9 is a view 9—9 of FIG. 6.
Figure 10:
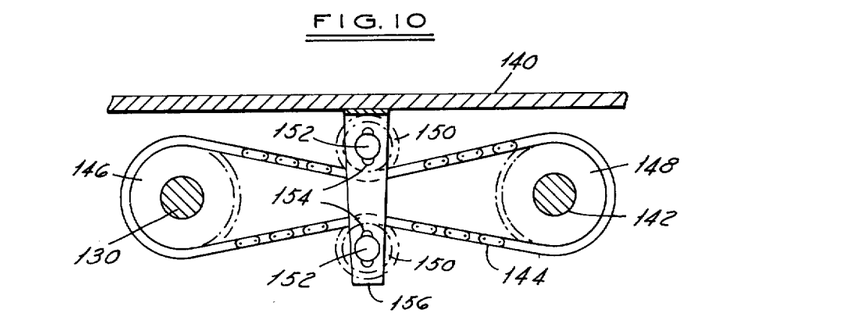
FIG. 10 is a view 10—10 of FIG. 9.
Figure 11:
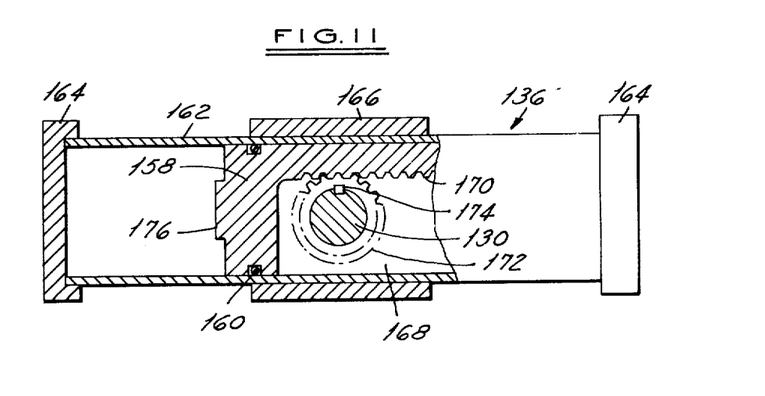
FIG. 11 is a sectional view 11—11 of FIG. 9.

FIGS. 9 through 11 show a mechanism for furnishing the oscillating power to the loader illustrated in FIGS. 6 through 8. Shaft 130 is journalled in bearing 132 mounted in block 134. The lower end of shaft 130 is operably connected with a fluid drive assembly 136. The drive assembly is supported by bracket 138 which along with block 134 is secured to mounting plate 140. A second vertical shaft 142 spaced from shaft 130 is mounted in a similar manner except its lower end is supported by bearing 141 in block 143 and receives its power through roller chain 144 engaging sprockets 146 and 148 that are keyed to shafts 130 and 142, respectively.

The timing of the angular relationship between the two loading levers 106 and 108 is critical for the proper operation functioning of the double loader. The arrangement must not only allow adjustment for the initial timing of levers 106,108, but also provide for the readjustment of the relative positions of these levers to compensate for wear of the components, especially the chain, that occurs during the life of the mechanism. The timing of lever 108 is accomplished through the proper location of the keyways in shaft 130 as they relate to the lever and fluid drive assembly 136. FIG. 10 shows an arrangement for timing lever 106 and shaft 142, relative to shaft 130. Two idler sprockets 150 are journalled on shoulder pins 152 in slots 154 of bracket 156 in such a manner that either or both runs of chain 144 can be laterally displaced. The chain is initially assembled on sprockets 146 and 148 to the nearest tooth and the final timing is accomplished by the proper adjustment of idlers 150 in slots 154. It will be obvious that the proper tightening of the chain will be accomplished when the timing is adjusted.

The construction of the fluid drive assembly 136 is shown in FIG. 11. A symmetrical piston 158 having end seals 160 is slidably arranged in the bore of cylinder 162 which is sealed at both ends by covers 164 and mounted on a support 166. Piston 158 is cut away to form a recess 168 therein which has rack teeth 170 formed on one side engaging a pinion 172. Pinion 172 is supported by bearings (not illustrated) in support 166. Pinion 172 is fastened to shaft 130 by key 174. When the ends of cylinder 162 are connected to a fluid pressure source through suitable valving, the ends will alternately be subjected to pressure and exhaust in response to the signals initiated by switch 100 in FIG. 1. Piston 158 will reciprocate causing shaft 130 to oscillate through the cooperation of rack 170 and pinion 172. The angular displacement of shaft 130 is determined by the stroke of piston 158 which is in turn determined by the length of stops 176.

While the foregoing description of powering the mechanism has been directed to a double loader, it can be readily seen that powering a single loader would involve only the omission of the chain and sprocket drive employed for rotating and timing the second lever 106. Thus, fluid drive assembly 136 in FIG. 9 could be secured to shaft 54 of FIG. 3.

Figures 12, 13, 14, 15:
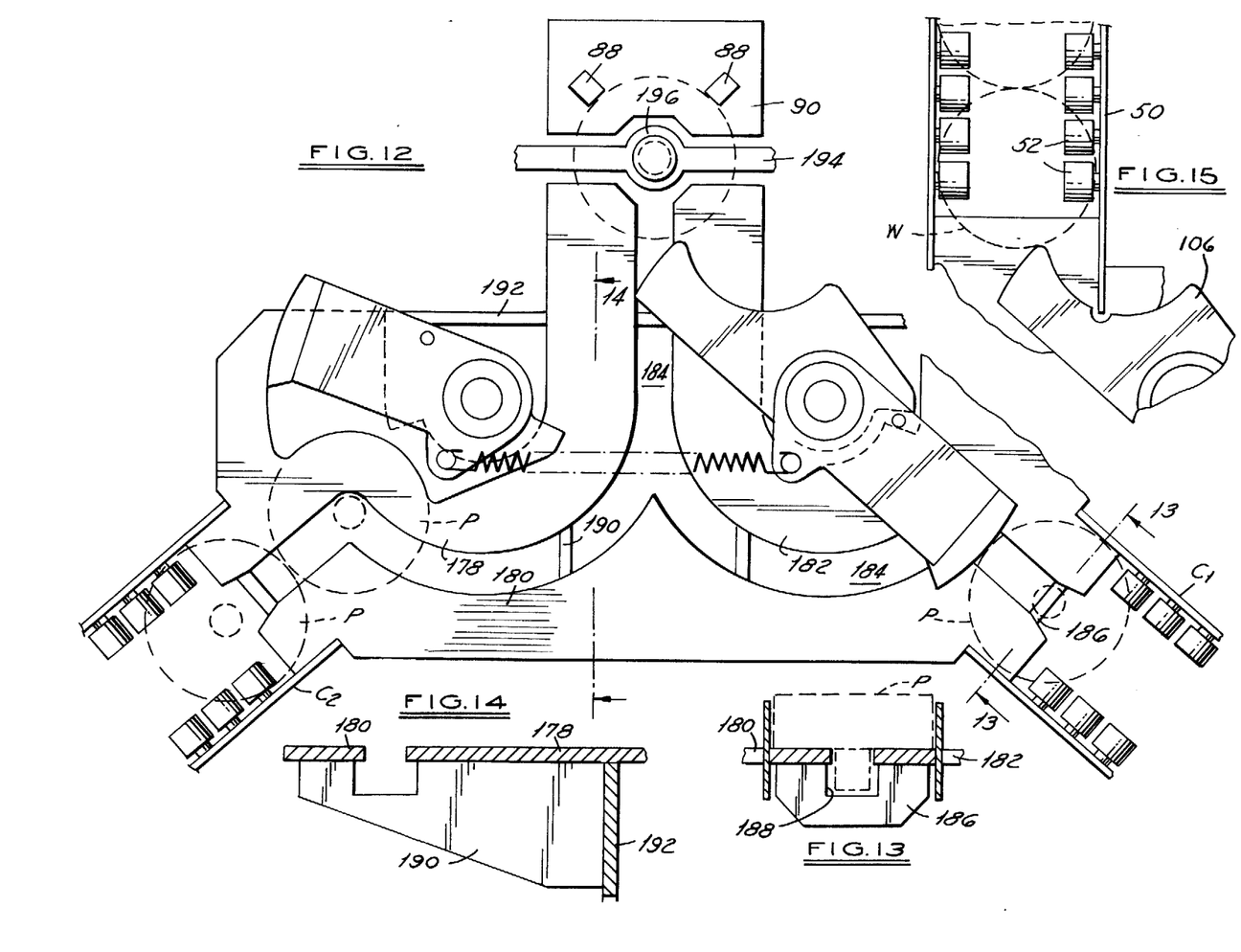
FIG. 12 is a partially fragmented plan view of another version of a two source blending loader.
FIG. 13 is a sectional view along line 13—13 of FIG. 12.
FIG. 14 is a sectional view along line 14—14 of FIG. 12.
FIG. 15 is a fragmented plan view of a blender.

FIGS. 12, 13 and 14 show a version of the invention where the unusual shape of a workpiece is utilized to change the structure of the loader with a goal toward simplification. This is suggested, not to change the intent or the spirit of the invention, but to demonstrate that in many applications the profile characteristics of a workpiece can be utilized for cost reduction. In this embodiment a workpiece P is substantially cylindrical in shape and has a concentric stub shaft on one end. The support plate of the loader is constructed of three parts 178, 180 and 182 in such a manner as to create a guide slot 184.

As shown in FIG. 13 rib 186 connects and supports plates 180 and 182 and has a notch 188 to clear the stub shaft of workpiece P. As shown in FIG. 14, a bracket 190 connects plates 178 and 180 and supports them on a mounting plate 192. It will be noted that the side guides shown in the previously described loaders are omitted and the guiding of the workpiece from conveyors C1,C2 to the nest 90 of the elevator is accomplished solely by slots 184 which are engaged by the stub shafts on the underside of the workpieces. The carrier assembly 194 is constructed with a ringed shaped portion 196 to surround and locate the stub shaft on the underside of workpiece P when it is being elevated.

FIG. 15 demonstrates how the described arrangement may be used, not as a machine loader but solely as a blender. Workpieces W may be taken from two conveyor lines, such as C1 and C2 as shown in FIG. 12, and alternately delivered into a single conveyor line 50 positioned at a location corresponding to the previously described nest 90 of a machine. This easily and inexpensively solves a common problem often existing in manufacturing facilities where conveying systems are extensively used.

While the invention has been described with reference to preferred embodiments, it is obvious that the equivalent alteration amd modifications will occur to others skilled in the art upon reading and understanding the specification. The present invention is limited only by the scope of the claims.

I claim:

1. In a mechanism for transferring in succession each of a lineal series of workpieces from a position at the downstream end of a conveyor in an arcuate path to a loading station spaced from the end of the conveyor comprising, a workpiece support extending between the end of the conveyor to said loading station and providing a generally flat support surface, a work transfer lever journalled on an axis generally perpendicular to said planar surface, means for oscillating said lever about said axis in a plane generally parallel to the plane of said support between a retracted position adjacent the end of the conveyor and an advanced position adjacent the loading station, said lever having means thereon which, when the lever is in the retracted position, are adapted to engage the leading workpiece at the end of the conveyor and displace it along said arcuate path to said loading station when the lever swings from the retracted to the advanced position, a stop arm journalled at said axis for rotation in a plane parallel to the plane of oscillation of said lever, said stop arm having a portion disposed at the trailing side of said lever as the lever swings from the retracted to the advanced position, said portion of said arm having a free end spaced radially outwardly from said axis beyond the workpiece engaging means on said lever, said free end forming an abutment adapted to engage the second-in-line workpiece on the conveyor and thereby restrain advancing movement of the series of workpieces on the conveyor when the leading workpiece is engaged and advanced by the engaging means on said lever, and means including a lost motion connection between the lever and arm for causing said arm to swing to a position wherein its free end is disposed for abutment with the second-in-line workpiece on the conveyor when the lever swings past the end of the conveyor toward the loading station, said last-mentioned means maintaining said arm in said position abutting the second-in-line workpiece until said lever returns to said retracted position.

2. The combination called for in claim 1 wherein said lost motion connection comprises abutment means on said lever and arm which are interengaged when the lever is in the retracted position and resilient means acting on said arm for causing the arm and lever to rotate in unison as the lever advances from the retracted position.

3. The combination called for in claim 2 including means for limiting rotation of said arm in the advancing direction through an arc of substantially less extent than the extent of arcuate movement of said lever so that the movement of said arm in a direction away from the retracted position is arrested when its free end is abutted by the second-in-line workpiece while the lever continues to swing toward said advanced position.

4. The combination called for in claim 3 wherein the abutment means on the arm lie in the path of travel of the abutment means on the lever when the lever is swinging toward its retracted position to thereby cause the lever to swing said arm in the retracting direction as the lever approaches the retracted position.

5. The combination called for in claim 1 wherein the free end of said arm is of arcuate shape.

6. The combination called for in claim 5 wherein the extent of arcuate travel of said lever is a multiple of the arcuate extent of the free end of said arm.

7. The combination called for in claim 1 wherein said lever has a radially outer free end, the free end of said arm forming a circumferential extension of the free end of said lever.

8. The combination called for in claim 7 wherein the free ends of said lever and arm define a generally continuous curve.

9. The combination called for in claim 1 wherein said workpiece engaging means on said lever comprises a pocket formed on the leading side of the lever, said lever having a rounded nose portion adjacent the radially outer end of said pocket and including means at said loading station for engaging a workpiece being transferred by the arm, arresting arcuate movement of the workpiece as the lever continues to rotate toward the advanced position to thereby disengage the workpiece from said pocket and cause said nose portion to engage the workpiece and advance it into said loading station.

10. The combination called for in claim 1 including a second conveyor having its discharge end spaced from the end of the first-mentioned conveyor, a second lever and arm constructed and arranged the same as the first lever and arm for oscillation about a second axis parallel to and spaced from the first-mentioned axis, said workpiece support also extending between the end of the second conveyor and said loading station, said loading station and the ends of the two conveyors being located on opposite sides of a line interconnecting said two axes, said two axes and the ends of the two conveyors being disposed symmetrically relative to a line extending from said loading station perpendicular to said line interconnecting the two axes, means for oscillating the second lever in the same direction as and in unison with the first lever from a retracted position adjacent the end of the second conveyor to an advanced position adjacent said loading station, said levers being oriented relative to each other so that when one is in the advanced position the other is in the retracted position, the workpiece engaging means on the two levers being spaced from the respective axes of the levers a distance such that the path of travel of the workpiece transferred by the first lever registers with the path of travel of the workpice transferred by the second lever as the levers approach the advanced position so that the two workpieces are adapted to successively occupy the same position at the loading station.

11. The combination called for in claim 10 including a resiliently flexible guide member disposed centrally between said two axes for retaining the workpieces interengaged with the workpiece engaging means on the respective levers as the levers swing toward said loading station, said guide member extending in a direction towards, but terminating short of, said loading station.

12. The combination called for in claim 11 wherein the leading side of each lever at a portion spaced radially inwardly from the workpiece engaging means thereon is shaped to guide the workpiece being transferred by the other lever into said loading station as each lever approaches its retracted position and the workpiece advances beyond the end of said quide member.

13. The combination called for in claim 12 wherein the workpieces are of circular shape and the workpiece engaging means on each lever comprises a pocket adapted to extend around less than half of the periphery of the workpiece.

14. The combination called for in claim 10 wherein said workpiece support has a pair of arcuate grooves therein, each concentric to and spaced the same radial distance from a respective one of said axes, said arcuate grooves extending from adjacent the end of each conveyor and tangentially merging into a single groove adjacent said line interconnecting the two axes, said single groove extending in a rectilinear path from said point of merging to said loading station, said grooves being adapted to engage projections on the underside of the workpieces and thereby guide the workpieces as they are transferred by said levers from the ends of the conveyors to said loading station.

15. In combination a pair of conveyors having their discharge ends spaced apart, means forming a loading station disposed centrally between the ends of the conveyor and laterally offset therefrom, a workpiece support extending between the ends of the conveyors and said loading station and presenting a generally flat support surface, a pair of workpiece transfer levers journalled for rotation about spaced axes perpendicular to the plane of said support surface, said two axes being symmetrically disposed on opposite sides of a line extending centrally between the ends of the conveyors and to said loading station, means for oscillating said levers in unison and in the same direction in an arcuate path between a retracted position adjacent the end of the respective conveyor and an advanced position adjacent said loading station, said levers being oriented relative to each other so that when one lever is in the retracted position the other is in the advanced position, the leading side of each lever, with respect to its movement toward the advanced position, having means thereon for engaging a workpiece positioned at the end of its respective conveyor and displacing the workpiece in an arcuate path toward the loading station, said levers each having a length such that the arcuate path of travel of the workpieces from the two conveyors radially overlap as they approach the loading station, a resiliently flexible and laterally deflectable guide member disposed centrally between said two axes and having a free end extending toward said loading station, said guide member lying in the path of travel of the workpieces transferred by both levers to maintain the workpiece engaged with its respective lever as the two levers rotate alternately toward the advanced position.

16. The combination called for in claim 15 wherein said guide member comprises a rigid member pivotably supported for movement in a plane parallel to the plane of said support and spring means acting on said member and biasing it to a centered position between said two axes.

17. The combination called for in claim 15 including additional guide means extending in an arcuate path from adjacent the end of each conveyor to adjacent said flexible guide member.

18. The combination called for in claim 17 wherein the free end of the flexible guide member terminates on that side of a line interconnecting said two axes which is opposite said loading station, said leading side of each lever having a portion which, when the lever is rotating toward said retracted position, cooperates with said flexible guide member to guide the workpiece being transferred by the other lever into said loading station.

19. The combination called for in claim 18 wherein said portion of said leading side of each lever is of curved convex shape relative to the axis of rotation of its respective lever.

20. The combination called for in claim 18 wherein the workpieces are of circular shape and the workpiece engaging means on the leading side of each lever comprise a recess adapted to extend around less than half of the circumference of each workpiece.

* * * * *

UNITED STATES PATENT OFFICE
CERTIFICATE OF CORRECTION

Patent No. 3,905,466        Dated 9-16-75

Inventor(s) Walter H. Van Deberg

It is certified that error appears in the above-identified patent and that said Letters Patent are hereby corrected as shown below:

Column 1, line 35, "then" should be --them--.

Column 2, line 4, "shown should be --shows--.

Column 4, line 1, "tetracted" should be --retracted--.

Column 6, line 47, "amd" should be --and--.

Column 8, line 25, "workpice" should be --workpiece--.

Column 8, line 44, "quide" should be --guide--.

Signed and Sealed this sixteenth Day of March 1976

[SEAL]

Attest:

RUTH C. MASON
*Attesting Officer*

C. MARSHALL DANN
*Commissioner of Patents and Trademarks*